United States Patent
Georgin et al.

(10) Patent No.: US 12,330,619 B2
(45) Date of Patent: Jun. 17, 2025

(54) ALTERNATE-SECONDARY SYSTEM IN PRESSURE CONTROL MODE FOR MINIMAL BRAKING DISRUPTION IN A PRIMARY-ALTERNATE BRAKING SYSTEM

(71) Applicant: Goodrich Corporation, Charlotte, NC (US)

(72) Inventors: Marc J. Georgin, Dayton, OH (US); Richard A. Poisson, Avon, CT (US)

(73) Assignee: GOODRICH CORPORATION, Charlotte, NC (US)

( * ) Notice: Subject to any disclaimer, the term of this patent is extended or adjusted under 35 U.S.C. 154(b) by 297 days.

(21) Appl. No.: 17/853,620

(22) Filed: Jun. 29, 2022

(65) Prior Publication Data
US 2024/0001897 A1    Jan. 4, 2024

(51) Int. Cl.
*B60T 8/94*    (2006.01)
*B64C 25/44*    (2006.01)

(52) U.S. Cl.
CPC ............... *B60T 8/94* (2013.01); *B64C 25/44* (2013.01); *B60T 2270/402* (2013.01)

(58) Field of Classification Search
CPC ...... B60T 8/94; B60T 2270/402; B60T 8/325; B60T 8/1703; B64C 25/44; B64C 25/42
See application file for complete search history.

(56) References Cited

U.S. PATENT DOCUMENTS

| | | | | |
|---|---|---|---|---|
| 4,166,654 | A | * | 9/1979 | Snodgrass ............... B60T 17/18 303/14 |
| 6,513,885 | B1 | * | 2/2003 | Salamat ................ B60T 8/1703 303/DIG. 9 |
| 6,820,946 | B2 | | 11/2004 | Salamat et al. |
| 10,300,896 | B2 | | 5/2019 | Jones et al. |
| 2019/0168724 | A1 | * | 6/2019 | VandenBerg, III ..... B60T 8/171 |
| 2020/0001984 | A1 | * | 1/2020 | Hubbard ............... F15B 13/042 |
| 2020/0307530 | A1 | | 10/2020 | Georgin |
| 2020/0317327 | A1 | | 10/2020 | Arsenault |
| 2021/0086734 | A1 | | 3/2021 | Georgin |
| 2021/0179261 | A1 | | 6/2021 | Arsenault et al. |
| 2022/0055600 | A1 | | 2/2022 | Georgin et al. |
| 2022/0073040 | A1 | | 3/2022 | Georgin et al. |
| 2022/0097832 | A1 | | 3/2022 | Georgin et al. |
| 2022/0194335 | A1 | * | 6/2022 | Howell ................. B60T 13/686 |

OTHER PUBLICATIONS

European Patent Office, European Partial Search Report dated Dec. 20, 2023 in Application No. 23181902.0.
European Patent Office, European Search Report dated Mar. 13, 2024 in Application No. 23181902.0.

* cited by examiner

*Primary Examiner* — Navid Z. Mehdizadeh
*Assistant Examiner* — Caitlin R McCleary
(74) *Attorney, Agent, or Firm* — SNELL & WILMER L.L.P.

(57) ABSTRACT

A method of controlling an aircraft braking system includes initiating the aircraft braking system by receiving a first brake command at a primary system to actuate braking via the primary system, receiving the first brake command at an alternate system, and in response to the primary system losing an ability to control a brake, controlling the braking of the brake via the alternate system.

6 Claims, 4 Drawing Sheets

ALTERNATE-SECONDARY SYSTEM IN PRESSURE CONTROL MODE FOR MINIMAL BRAKING DISRUPTION IN A PRIMARY-ALTERNATE BRAKING SYSTEM

FIELD

The present disclosure generally relates to the field of aircraft and, more particularly, to control of aircraft braking systems.

BACKGROUND

In a brake control system with a primary/alternate architecture, there are two independent brake systems. When one is active, for example the primary system, the alternate system is in stand-by mode. If the primary system suddenly fails, then braking responsibility transfers to the alternate system. Depending on the standby mode of the alternate system, it can take quite a while for braking to resume, and this timing is important during an RTO or Landing event.

SUMMARY

A method for controlling an aircraft braking system is described herein. The method includes initiating the aircraft braking system by receiving a first brake command at a primary system to actuate braking via the primary system, receiving the first brake command at an alternate system, and in response to the primary system losing an ability to control a brake, controlling the braking of the brake via the alternate system.

In various embodiments, the first brake command is received based on at least one of a pedal braking initiated by a pilot, autobraking during landing, RTO, or gear retraction.

In various embodiments, the method includes actuating, via the primary system, the brake in response to receiving the first brake command.

In various embodiments, the method includes determining a second brake command based on the first brake command.

In various embodiments, the second brake command is the first brake command minus a predetermined pressure.

In various embodiments, the method includes operating the primary system at a first pressure based on the first brake command and operating the alternate system at a second pressure based on the second brake command, the second pressure being less than the first pressure.

In various embodiments, switching to the alternate system includes toggling a shuttle valve in response to a pressure change such that the shuttle valve switches operation from the primary system to the alternate system.

In various embodiments, the method includes operating the alternate system based on alternate system brake commands independent from the first brake command in response to switching over to the alternate system.

In various embodiments, the alternate system is operating at the second pressure prior to the shuttle valve switch such that braking disruption is reduced during the transition between the primary system and the alternate system.

In various embodiments, the alternate system brake commands are based on at least one of a pedal braking initiated by a pilot, autobraking during landing and RTO, or gear retracting.

In various embodiments, the primary system is configured to operate as the alternate system and the alternate system is configured to operate as the primary system.

In various embodiments, the predetermined pressure is 160 psi.

In another aspect, an aircraft braking system is described herein. The aircraft braking system includes a first brake control unit configured to determine a first brake pressure, a second brake control unit operatively coupled to the first brake control unit, and a shuttle valve operatively coupled to the first and second brake control units. The shuttle valve is configured to receive the first brake pressure.

In various embodiments, the first brake pressure is determined relative to a pedal displacement.

In various embodiments, the first brake control unit or the second brake control unit is a primary brake control unit and the other of the first brake control unit and the second brake control unit is a secondary brake control unit.

In various embodiments, the shuttle valve comprises a check ball such that the check ball is forced to one side of the shuttle valve in response to a pressure change such that the shuttle valve switches operation from the primary brake control unit to the secondary brake control unit.

In various embodiments, the first brake control unit includes a first outboard brake control card (BCC) and a first inboard BCC.

In various embodiments, a first pedal position sensor is operatively interconnected with the first inboard BCC of the first brake control unit. The first pedal position sensor is configured to determine the pedal displacement.

In various embodiments, the second brake control unit is configured to determine a second brake pressure based on the first brake pressure. The second brake pressure is less than the first brake pressure.

In various embodiments, the first brake control unit is configured to operate at the first brake pressure and the second brake control unit is configured to operate at the second brake pressure.

BRIEF DESCRIPTION OF THE DRAWINGS

The subject matter of the present disclosure is particularly pointed out and distinctly claimed in the concluding portion of the specification. An understanding of the present disclosure may be further facilitated by referring to the following detailed description and claims in connection with the following drawings. While the drawings illustrate various embodiments employing the principles described herein, the drawings do not limit the scope of the claims. Reference to "in accordance with various embodiments" in this Brief Description of the Drawings also applies to the corresponding discussion in the Detailed Description.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, a first component that is "radially outward" of a second component means that the first component is positioned at a greater distance away from a common axis (e.g., a rotational axis of a wheel assembly) than the second component. A first component that is "radially inward" of a second component means that the first component is positioned closer to the common axis than the second component. In the case of components that rotate about a common axis, a first component that is radially inward of a second component rotates through a circumferentially shorter path than the second component. As used herein, "distal" refers to the direction outward, or generally, away from a reference component. As used herein, "proximal" and/or "proximate" refer to a direction inward, or generally, towards the reference component. All ranges may include the upper and lower values, and all ranges and ratio limits disclosed herein may be combined. Unless specifically stated otherwise, reference to "a," "an" or "the" may include one or more than one and reference to an item in the singular may also include the item in the plural.

The system disclosed herein, in various embodiments, addresses an optimized active mode for the secondary system (e.g., a standby mode) and relies on a system architecture with shuttle valves to ensure there is minimal braking disruption. In such a brake control system with a primary/alternate architecture, such as the one described herein, each brake system is independent and can alternately be active. For instance, while the primary system is braking, the brake pressures and brake pressure commands are transferred to the alternate system. The alternate system, though not the active one, applies braking using brake pressure commands that are the provided brake pressure commands from the primary channel minus a predetermined pressure.

Figure 1A:
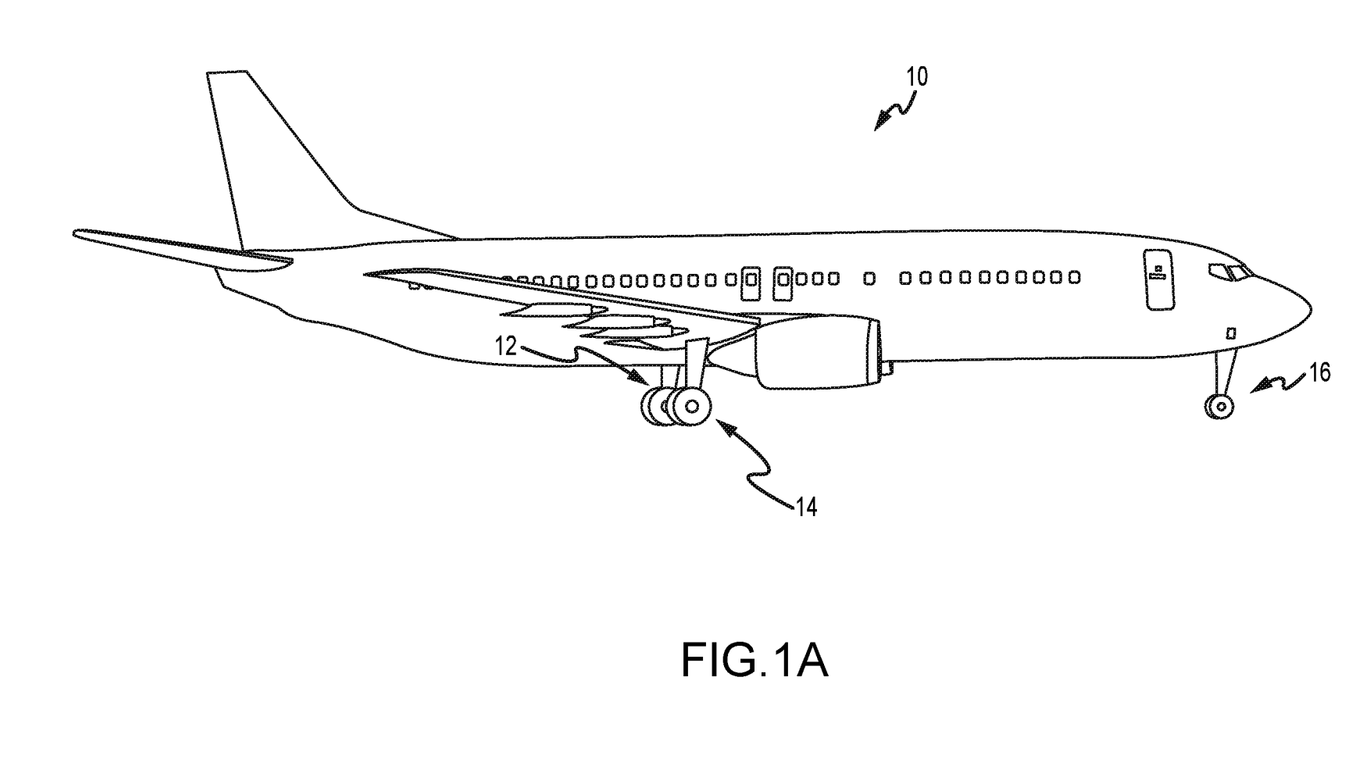
FIG. 1A illustrates an exemplary aircraft having a brake assembly in accordance with various embodiments.

Referring to FIG. 1A, in accordance with various embodiments, an aircraft 10 is illustrated. The aircraft 10 includes landing gear, which may include a left main landing gear 12, a right main landing gear 14 and a nose landing gear 16. The landing gear support the aircraft 10 when it is not flying, allowing the aircraft 10 to taxi, take off and land without damage. While the disclosure refers to the three landing gear configurations just referred, the disclosure nevertheless contemplates any number of landing gear configurations.

Figure 1B:
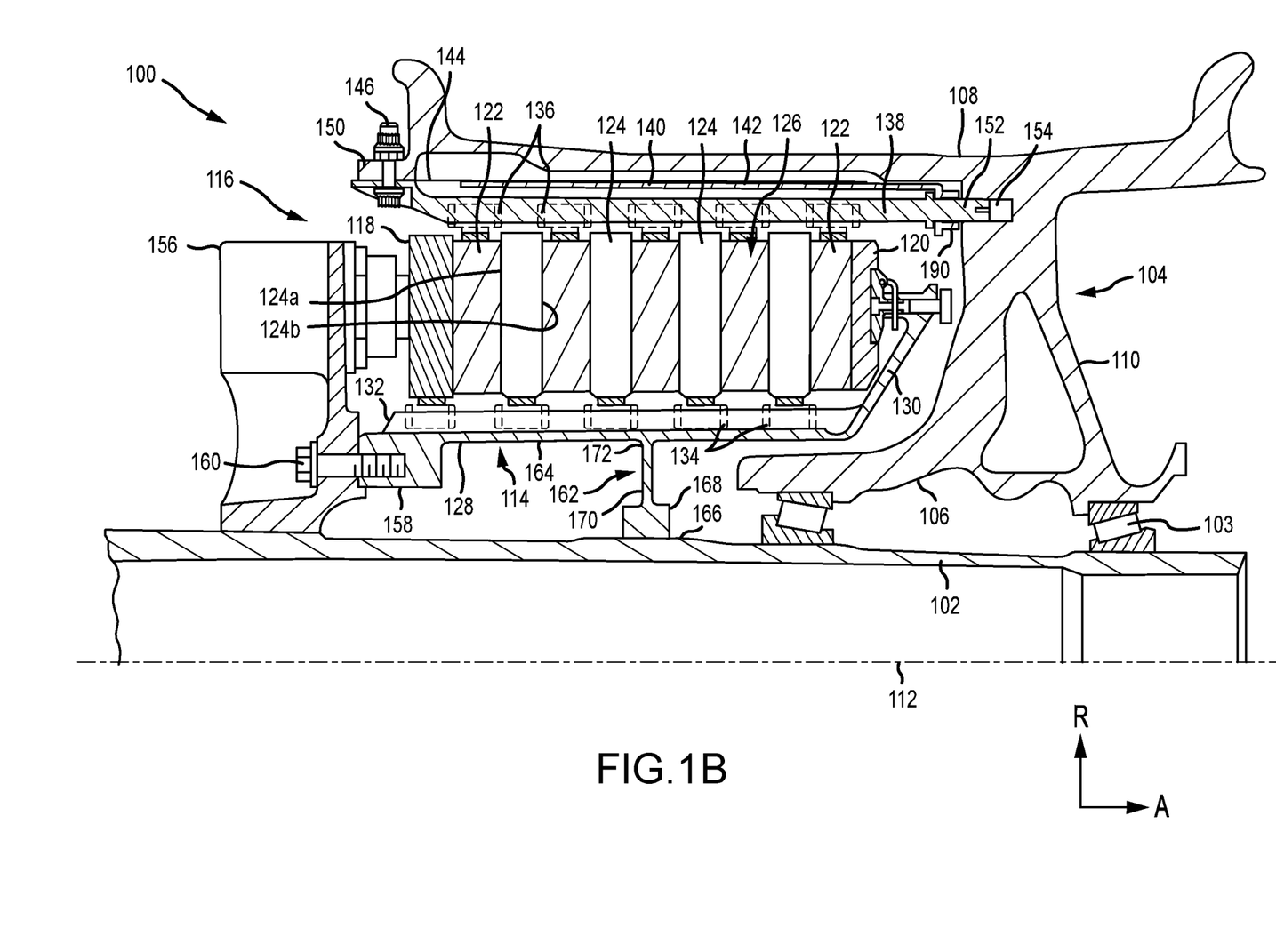
FIG. 1B illustrates a cross-sectional view of a brake assembly in accordance with various embodiments.

Referring now to FIG. 1B, there is schematically depicted a brake assembly or a brake mechanism 100 that may be used by the aircraft 10 of FIG. 1A or any other appropriate aircraft. The brake mechanism 100 is mounted on an axle 102 for use with a wheel 104 disposed on and configured to rotate about the axle 102 via one or more bearing assemblies 103. The wheel 104 includes a hub 106, a wheel well 108 concentric about the hub 106 and a web portion 110 interconnecting the hub 106 and the wheel well 108. A central axis 112 extends through the axle 102 and defines a center of rotation of the wheel 104. A torque plate barrel 114 (sometimes referred to as a torque tube or barrel or a torque plate or back leg) is aligned concentrically with the hub 106, and the wheel 104 is rotatable relative to the torque plate barrel 114.

The brake mechanism 100 includes a piston assembly 116, a pressure plate 118 disposed adjacent the piston assembly 116, an end plate 120 positioned a distal location from the piston assembly 116, and a plurality of rotor disks 122 interleaved with a plurality of stator disks 124 positioned intermediate the pressure plate 118 and the end plate 120. The pressure plate 118, the plurality of rotor disks 122, the plurality of stator disks 124 and the end plate 120 together form a brake heat sink or brake stack 126. The pressure plate 118, the end plate 120 and the plurality of stator disks 124 are mounted to the torque plate barrel 114 and remain rotationally stationary relative to the axle 102. Each stator disk 124 includes a pair of oppositely disposed sides 124a, 124b that each interface with a corresponding rotor disk 122 during a braking operation.

The torque plate barrel 114 may include an annular barrel or torque tube 128 and an annular plate or back leg 130. The back leg 130 is disposed at an end distal from the piston assembly 116 and may be made monolithic with the torque tube 128, as illustrated in FIG. 1B, or may be made as a separate annular piece and suitably connected to the torque tube 128. The torque tube 128 has a plurality of circumferentially spaced and axially extending splines 132 disposed on an outer surface of the torque tube 128. The plurality of stator disks 124 and the pressure plate 118 include notches or stator slots 134 on an inner periphery of the disks and the plate for engagement with the splines 132, such that each disk and the plate are axially slidable with respect to the torque tube 128.

The end plate 120 is suitably connected to the back leg 130 of the torque plate barrel 114 and is held non-rotatable, together with the plurality of stator disks 124 and the pressure plate 118, during a braking action. The plurality of rotor disks 122, interleaved between the pressure plate 118, the end plate 120 and the plurality of stator disks 124, each have a plurality of circumferentially spaced notches or rotor lugs 136 along an outer periphery of each disk for engagement with a plurality of torque bars 138 that is secured to or made monolithic with an inner periphery of the wheel 104.

An actuating mechanism for the brake mechanism 100 includes a plurality of piston assemblies, including the piston assembly 116, circumferentially spaced around an annular piston housing 156 (only one piston assembly is illustrated in FIG. 1B). Upon actuation, the plurality of piston assemblies affect a braking action by urging the pressure plate 118 and the plurality of stator disks 124 into frictional engagement with the plurality of rotor disks 122 and against the end plate 120. Fluid or hydraulic pressure, mechanical springs or electric actuators, among other mechanisms, may be used to actuate the plurality of piston assemblies. Through compression of the plurality of rotor disks 122 and the plurality of stator disks 124 between the pressure plate 118 and the end plate 120, the resulting frictional contact slows or stops or otherwise prevents rotation of the wheel 104. The plurality of rotor disks 122 and the plurality of stator disks 124 are fabricated from various materials, such as ceramic matrix composites, that enable the brake disks to withstand and dissipate the heat generated during and following a braking action.

The torque plate barrel 114 is secured to a stationary portion of the landing gear such as the axle 102, preventing the torque plate barrel 114 and the plurality of stator disks 124 from rotating during braking of the aircraft. The torque tube 128 portion of the torque plate barrel 114 may be attached to the annular piston housing 156 via an annular mounting surface 158, wherein bolt fasteners 160 secure the torque plate barrel 114 to the annular piston housing 156. A spacer member or pedestal 162 is positioned between an inner diameter surface 164 of the torque tube 128 and an outer diameter surface 166 of the axle 102. The pedestal 162 includes a radially inner surface or foot 168 for engaging the axle 102, a web portion 170 radially outward of the foot 168 and a head portion 172 for engaging the inner diameter surface 164 of the torque tube 128. The pedestal 162 augments support of the torque plate barrel 114 within the brake mechanism 100 generally and, more particularly, against the axle 102. The pedestal 162 may be made monolithic with the torque tube 128 portion of the torque plate barrel 114.

A heat shield 140 is secured directly or indirectly to the wheel 104 between a radially inward surface of the wheel well 108 and the plurality of torque bars 138. As illustrated in FIG. 1B, the heat shield 140 is concentric with the wheel well 108 and may have a plurality of heat shield sections 142 disposed between respective, adjacent pairs of the plurality of torque bars 138. The heat shield 140, or heat shield sections 142, is spaced from the radially inward surface of the wheel well 108 and secured in place by heat shield tabs 190, such that the heat shield 140, or heat shield sections 142, is disposed generally parallel to the axis of rotation or central axis 112 of the wheel 104 and intermediate the plurality of torque bars 138 and the radially inward surface of the wheel well 108. In various embodiments, including for heavy-duty applications, the heat shield 140, or heat shield sections 142, may be further secured in place by heat shield carriers 144.

The plurality of torque bars 138 is attached at axially inboard ends to the wheel 104 by torque bar bolts 146. The torque bar bolts 146 extend through respective holes in a flange 150 provided on the wheel 104 as shown, which flange 150 for purposes of the present description is intended to be considered as part of the wheel well 108. Each of the plurality of torque bars 138 may include a pin 152 or similar member at its axially outboard end (i.e., the end opposite the torque bar bolts 146) that is received within a hole 154 disposed proximate the web portion 110 of the wheel 104. The heat shield 140, or heat shield sections 142, is positioned adjacent a radially inward surface of the wheel well 108 and secured in place by the heat shield tabs 190.

Figure 2:
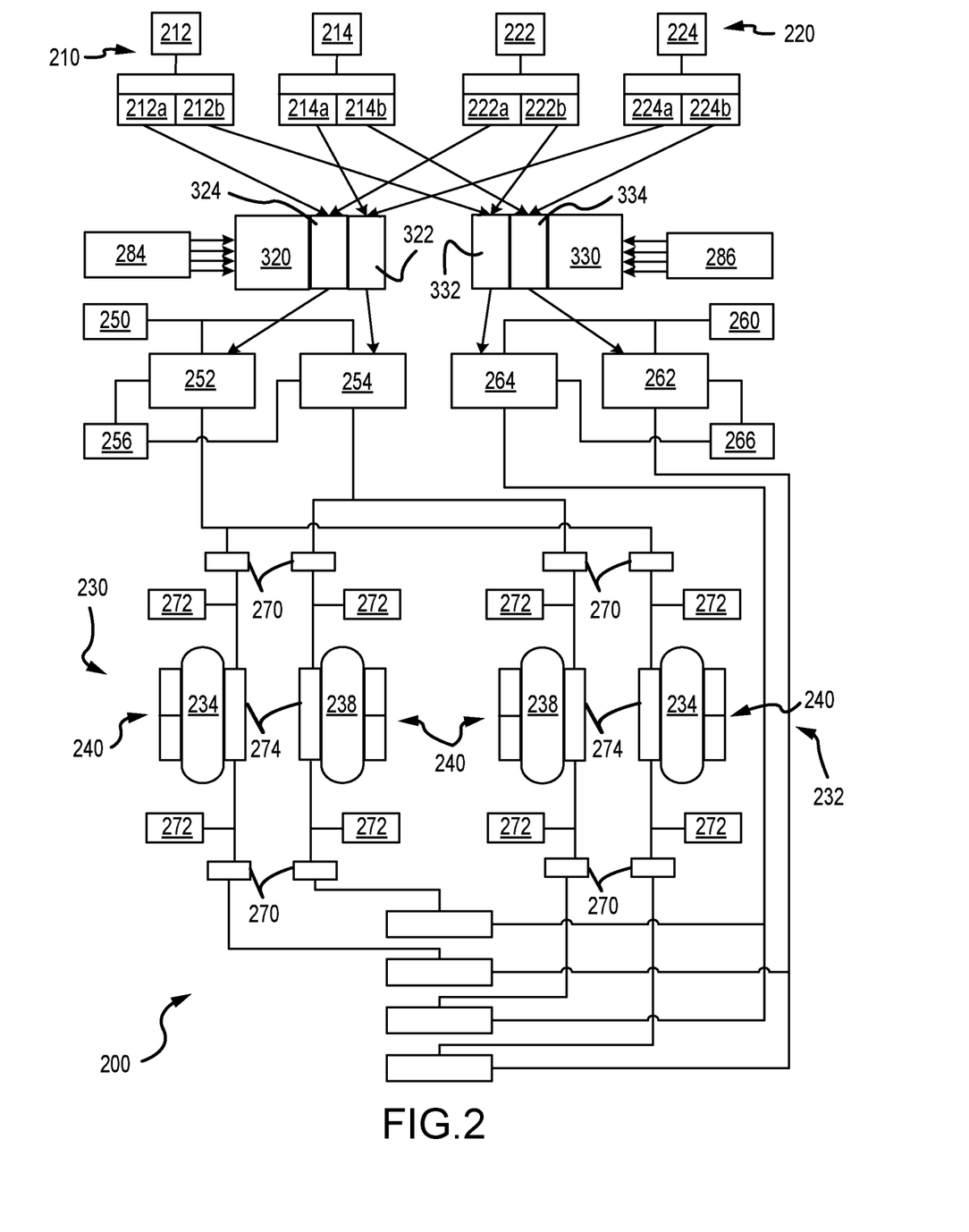
FIG. 2 is a schematic of an aircraft braking system in accordance with various embodiments.

Referring now to FIG. 2, an aircraft braking system 200 is illustrated in conjunction with an outboard wheel 234 and an inboard wheel 238 on each of a port side 230 and a starboard side 232 of an aircraft. A separate brake 240 is provided for each of the outboard wheels 234 and the inboard wheels 238. A hydraulic system pressure source A 250 is fluidly connected with an outboard dual brake control valve module 252 (in turn fluidly connected with the brake 240 for each of the outboard wheels 234) and an inboard dual brake control valve module 254 (in turn fluidly connected with the brake 240 for each of the inboard wheels 238). The aircraft braking system 200 further includes a hydraulic system A return 256. Similarly, a hydraulic system pressure source B 260 is fluidly connected with an outboard dual brake control valve module 262 (in turn fluidly connected with the brake 240 for each of the outboard wheels 234) and an inboard dual brake control valve module 264 (in turn fluidly connected with the brake 240 for each of the inboard wheels 238). The aircraft braking system 200 further includes a hydraulic system B return 266. The aircraft braking system further includes a plurality of hydraulic fuses 270, pressure transducers 272, shuttle valves 274, a 28 VDC (DC voltage) bus 284, and a 28 VDC bus 286.

The above-noted brake control modules 252, 254, 262, 264 may each utilize one or more servo valves, one or more shuttle (or shut-off) valves, or the like. Each shuttle valve (e.g., shuttle valves 274) for each of the above-noted brake control modules 252, 254, 262, 264 is disposed in the flowpath between its corresponding hydraulic system pressure source and its corresponding servo valve(s), with each shuttle valve being movable between an open and closed position in relation to the flow to its corresponding servo valve(s), and with each servo valve controlling the amount of flow to the brake of the corresponding wheel(s) (more specifically the braking pressure applied to the corresponding wheel(s)). As such, the shuttle valve(s) for each of the outboard dual brake control valve module 252 and the inboard dual brake control valve module 254 is disposed between its corresponding servo valve(s) and the hydraulic system A pressure source 250. Similarly, the shuttle valve(s) for each of the outboard dual brake control valve module 262 and the inboard dual brake control valve module 264 is disposed between its corresponding servo valve(s) and the hydraulic system B pressure source 260.

The aircraft braking system 200 of FIG. 2 further includes a first or pilot pedal pair 210 and a second/co-pilot pedal pair 220. The first pedal pair 210 includes a first (e.g., left) pedal 212 and a second (e.g., right) pedal 214. A first pedal position sensor 212a and a second pedal position sensor 212b monitor the position of the first pedal 212 (e.g., displacement of the first pedal 212). Similarly, a first pedal position sensor 214a and a second pedal position sensor 214b monitor the position of the second pedal 214 (e.g., displacement of the second pedal 214). The second pedal pair 220 includes a first (e.g., left) pedal 222 and a second (e.g., right) pedal 224. A first pedal position sensor 222a and a second pedal position sensor 222b monitor the position of the first pedal 222 (e.g., displacement of the first pedal 222). Similarly, a first pedal position sensor 224a and a second pedal position sensor 224b monitor the position of the second pedal 224 (e.g., displacement of the second pedal 224). Each of the pedal position sensors 212a/b, 214 a/b, 222a/b, and 224 a/b may be in the form of a linear variable differential transformer (LVDT).

The aircraft braking system 200 utilizes both a first (e.g., primary) brake control unit (BCU) 320 and a second (e.g., secondary or alternate) BCU 330. The first BCU 320 includes an inboard brake control card (BCC) 322 and an outboard BCC 324. Similarly, the second BCU 330 includes an inboard BCC 332 and an outboard BCC 334. FIG. 2 illustrates the following: 1) an output of the first pedal position sensor 212a for the first pedal 212 (first pedal pair 210) is provided to the outboard BCC 324 of the first BCU 320; 2) an output of the second pedal position sensor 212b for the first pedal 212 (first pedal pair 210) is provided to the inboard BCC 332 of the second BCU 330; 3) an output of the first pedal position sensor 214a for the second pedal 214 (first pedal pair 210) is provided to the inboard BCC 322 of the first BCU 320; 4) an output of the second pedal position sensor 214b for the second pedal 214 (first pedal pair 210) is provided to the outboard BCC 334 of the second BCU 330; 5) an output of the first pedal position sensor 222a for the first pedal 222 (second pedal pair 220) is provided to the outboard BCC 324 of the first BCU 320; 6) an output of the second pedal position sensor 222b for the first pedal 222 (second pedal pair 220) is provided to the inboard BCC 332 of the second BCU 330; 7) an output of the first pedal position sensor 224a for the second pedal 224 (second pedal pair 220) is provided to the inboard BCC 322 of the first BCU 320; and 8) an output of the second pedal position sensor 224b for the second pedal 224 (second pedal pair 220) is provided to the outboard BCC 334 of the second BCU 330.

The first and second BCU 320, 330 are in operative communication with the shuttle valves 274. In various embodiments, the first and second BCU 320, 330 may comprise various components to aid in selecting an inboard or outboard brake for a respective landing gear and determining a brake pressure to supply to each shuttle valve 274 in the selected shuttle valves 274 relative to a pedal displacement based on the number of selected brakes. For example, the first and second BCU 320, 330 may comprise a computing device (e.g., a processor) and an associated memory. The processor may comprise any suitable processor, such as, for example, a general purpose processor, a digital signal processor (DSP), an application specific integrated circuit (ASIC), a field programmable gate array (FPGA) or other programmable logic device, discrete gate or transistor logic, discrete hardware components, or any combination thereof. The memory may comprise an article of manufacture including a tangible, non-transitory computer-readable storage medium having instructions stored thereon that, in response to execution by the computing device (e.g., processor), cause the computing device to perform various methods, as discussed further herein.

Figure 3:
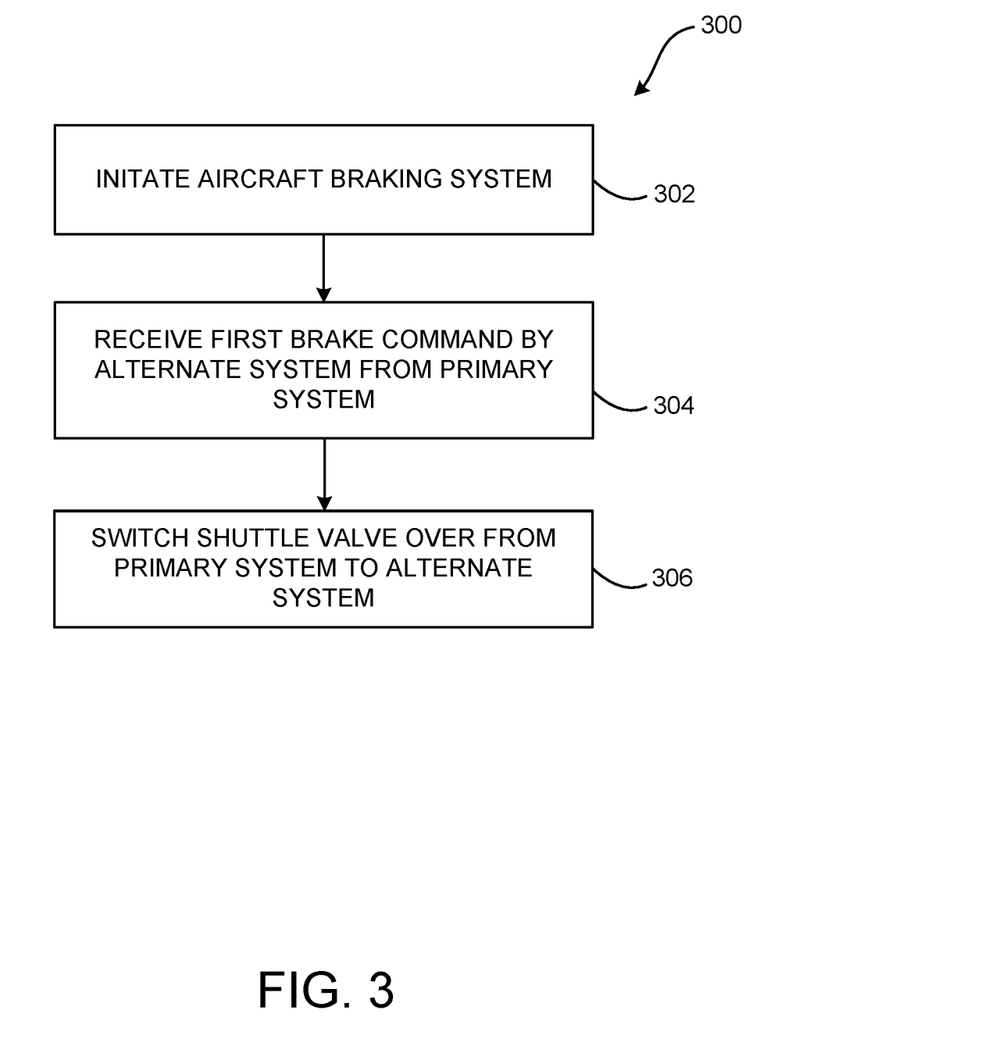
FIG. 3 is a flowchart of a method of controlling an aircraft braking system in accordance with various embodiments.

Referring now to FIG. 3, a method 300 of controlling an aircraft braking system is illustrated. At 302, the aircraft braking system is initiated. Several triggers, such as pedal braking initiated by the pilot, autobraking during landing and RTO or gear retract, for example, may cause a primary system (e.g., the first BCU 320) to receive a first braking command and cause the braking system to brake. In addition, braking is also modulated by the antiskid protection function. At 304, the first brake command received by the primary system are transferred to an alternate system (e.g., the second BCU 330). For instance, while the primary system is braking, the current brake pressure commands are passed to the alternate system. The data can be passed in any form, for example digital or analog, as long as it is fast enough to take care of the system latency. Because the system can be in antiskid protection control, it is beneficial to pass the data at a high enough rate if it is done digitally (e.g., 800 Hz or higher).

Accordingly, the alternate system, though not the active one, applies braking using brake pressure commands that are provided from the primary channel at 304. Particularly, the alternate system applies a second brake command which is equal to the first brake command minus a predetermined pressure (e.g., a deltaP). The predetermined pressure, or deltaP, is chosen to be at least as much as the worst-case shuttle pressure (of the shuttle valve that is mounted on the brake). In other words, the predetermined pressure is a pressure difference that would cause the shuttle valve to switch position. For instance, a typical shuttle valve pressure is 60-80 psi, and accordingly, the predetermined pressure may be 160 psi. In various embodiments, the predetermined pressure is determined by the particular shuttle valve used in the system and its specific switchover pressure. For instance, the shuttle valve functions as a dual sided check valve. When the pressure is at a high pressure, a check ball will be forced to the bottom side shutting off the lower pressure and allowing pressure to flow and actuate the brake. Because the alternate system applies brake pressure according to the same values that the active primary system uses but with a lesser value, the shuttle valve is prevented from switching over to the alternate system. In other words, while the primary system is outputting a first pressure, the secondary system is outputting a second pressure lower than the first pressure, and the shuttle valve will work towards the first pressure because it is higher.

Referring still to FIG. 3, at 306, in response to the primary system losing the ability to control the brake, the shuttle valve switches over to the secondary system. In such a configuration, instead of waiting for the secondary system to engage and come up to the desired pressure, the secondary system will already have been engaged at the second pressure and the braking system will not lose any significant braking traction. Since the second pressure is only the first pressure less the predetermined pressure, the full braking capability is achieved more rapidly and more efficiently than if the system was trying to start from an initial setting at the time of the switchover point.

In response to the primary system shutting off (e.g., due to errors), the alternate system may ignore the commands from the primary system and switches to using its own brake commands (e.g., alternate brake system commands) based on the state of the alternate system (e.g., a pedal braking initiated by a pilot, autobraking during landing and RTO, or gear retracting). Since the primary brake commands are removed, the shuttle valve automatically shuttles because the alternate system continues to apply pressure. The alternate system has now quickly switched back to normal operation and does not use the data that used to come from the primary system. Instead, it starts at the last commanded servo valves and from there provides braking according to the braking mode in use and using its own alternate sensors. The brake pressures will be within the predetermined pressure (e.g., 160 psi) of the previous values as soon as the shuttle valve shuttles. At this time, the alternate system switches its brake command inputs to the braking mode (pedal, autobrake, etc.) and uses its own pressure transducers as feedback and its own wheels speed transducers as well for antiskid protection to perform braking.

In various embodiments, as described herein, the primary system is active and the alternate system in on stand-by. However, in various embodiments, the alternate system may be the active system and the primary system is in stand-by. Accordingly, as the units become available, the last one "online" becomes the backup for the one that is currently in use. For example, in a series of power glitches, the primary system would transfer control to the alternate system, and then when the primary went back on, control would shift back to the primary system; generally, the system may toggle back-and-forth with no loss of braking as long as one is active. In other words, is the "primary system" is merely the one in command and the "secondary system" is the one out of command, or the backup system. If the primary is cycled or something happens where the primary becomes capable again, for instance in the power glitch example, it can take on the role of the backup control. It will now accommodate the fact that the secondary is in control and be its backup.

Generally, in method 300, the alternate system is running in pressure control mode at a lower pressure level than the active primary system. This approach provides braking transition from the primary system to the alternate system with minimal disruption in case of failure of the active primary system. The brake pressures and commands are applied (with the predetermined pressure), such that if the primary system fails, the shuttle valves shuttle and the alternate system continues braking with minimal disruption during landing or RTO events. The alternate system then continues in control with all braking modes and antiskid protection available.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

Any feature of any other various aspects addressed in this disclosure that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular. Moreover, any failure to use phrases such as "at least one" also does not limit the corresponding feature to the singular. Use of the phrase "at least substantially," "at least generally," or the like in relation to a particular feature encompasses the corresponding characteristic and insubstantial variations thereof (e.g., indicating that a surface is at least substantially or at least generally flat encompasses the surface actually being flat and insubstantial variations thereof). Finally, a reference of a feature in conjunction with the phrase "in one embodiment" does not limit the use of the feature to a single embodiment.

The foregoing description has been presented for purposes of illustration and description. Furthermore, the description is not intended to limit the invention to the form disclosed herein. Consequently, variations and modifications commensurate with the above teachings, and skill and knowledge of the relevant art, are within the scope of the present disclosure. Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An aircraft braking system comprising:
a first brake control unit configured to determine a first brake pressure and to operate at the first brake pressure, wherein the first brake control unit comprises a first outboard brake control card (BCC) and a first inboard BCC;
a second brake control unit operatively coupled to the first brake control unit and configured to determine a second brake pressure by subtracting a deltaP from the first brake pressure and to operate at the second brake pressure, wherein the second brake control unit comprises a second outboard BCC and a second inboard BCC, and wherein either the first brake control unit or the second brake control unit is a primary brake control unit and the other of the first brake control unit and the second brake control unit is a secondary brake control unit;
a first hydraulic pressure source;
a first outboard dual brake control valve module fluidly connected to the first hydraulic pressure source and operatively connected to the first outboard BCC;
a first inboard dual brake control valve module fluidly connected to the first hydraulic pressure source and operatively connected to the first inboard BCC; and a first shuttle valve operatively coupled to the first and second brake control units and having a check ball, the first shuttle valve configured to receive the first brake pressure and the second brake pressure, wherein the check ball is forced to one side of the first shuttle valve in response to a pressure change such that the first shuttle valve switches operation from the primary brake control unit to the secondary brake control unit, wherein the deltaP is a predetermined pressure difference that would cause the check ball of the first shuttle valve to switch position in response to the first brake control unit ceasing to provide the first brake pressure.

2. The aircraft braking system of claim 1, wherein the first brake pressure is determined relative to a pedal displacement.

3. The aircraft braking system of claim 2, wherein a first pedal position sensor is operatively interconnected with the first inboard BCC of the first brake control unit, wherein the first pedal position sensor is configured to determine the pedal displacement.

4. The aircraft braking system of claim 1, further comprising:

a second hydraulic pressure source;

a second outboard dual brake control valve module fluidly connected to the second hydraulic pressure source and operatively connected to the second outboard BCC; and a second inboard dual brake control valve module fluidly connected to the second hydraulic pressure source and operatively connected to the second inboard BCC.

5. The aircraft braking system of claim 4, further comprising a second shuttle valve operatively coupled to the first and second brake control units, the second shuttle valve configured to receive the first brake pressure.

6. The aircraft braking system of claim 5, wherein the first shuttle valve is fluidly connected to a first outboard brake, the first outboard dual brake control valve module, and the second outboard dual brake control valve module, and wherein the second shuttle valve is fluidly connected to a first inboard brake, the first inboard dual brake control valve module, and the second inboard dual brake control valve module.

* * * * *